(12) United States Patent
Hagiwara et al.

(10) Patent No.: US 12,134,914 B2
(45) Date of Patent: Nov. 5, 2024

(54) LOCK KNOB ATTACHMENT, LAVATORY DOOR, AND METHOD FOR MOUNTING LOCK KNOB ATTACHMENT

(71) Applicant: JAMCO CORPORATION, Tokyo (JP)

(72) Inventors: Hisaya Hagiwara, Tokyo (JP); Sachiko Fukutomi, Tokyo (JP)

(73) Assignee: JAMCO CORPORATION, Tokyo (JP)

( * ) Notice: Subject to any disclaimer, the term of this patent is extended or adjusted under 35 U.S.C. 154(b) by 51 days.

(21) Appl. No.: 17/767,900

(22) PCT Filed: Mar. 15, 2021

(86) PCT No.: PCT/JP2021/010333
§ 371 (c)(1),
(2) Date: Apr. 10, 2022

(87) PCT Pub. No.: WO2021/246018
PCT Pub. Date: Dec. 9, 2021

(65) Prior Publication Data
US 2024/0035303 A1    Feb. 1, 2024

(30) Foreign Application Priority Data
Jun. 1, 2020    (JP) ................................ 2020-095239

(51) Int. Cl.
*E05B 1/00*    (2006.01)
*B64C 1/14*    (2006.01)
(Continued)

(52) U.S. Cl.
CPC .......... *E05B 1/0053* (2013.01); *B64C 1/1407* (2013.01); *E05B 3/00* (2013.01);
(Continued)

(58) Field of Classification Search
CPC ...... E05B 3/00; E05B 65/0035; E05B 1/0053; E05B 65/0007; E05C 1/004; E05C 1/04; E05C 1/10; E05C 1/16; E05C 1/166
See application file for complete search history.

(56) References Cited

U.S. PATENT DOCUMENTS

| 114,152 | A | * | 4/1871 | Judd ........................ E05C 1/10 |
| | | | | 292/175 |
| 130,902 | A | * | 8/1872 | Cramer ............... E05B 65/0864 |
| | | | | 292/175 |

(Continued)

FOREIGN PATENT DOCUMENTS

| EP | 1132556 B1 | 6/2004 | |
| GB | 156908 A | * 1/1921 | ............... E05C 1/10 |

(Continued)

OTHER PUBLICATIONS

International Search Report for corresponding Application No. PCT/JP2021/010333, mailed Jun. 1, 2021.

(Continued)

*Primary Examiner* — Christine M Mills
*Assistant Examiner* — Faria F Ahmad
(74) *Attorney, Agent, or Firm* — Renner, Otto, Boisselle & Sklar, LLP

(57) ABSTRACT

A lock knob attachment includes an attachment portion configured to be attached to a lock bar that is configured to lock a door by sliding in a first direction, and a main body portion configured to be coupled to the attachment portion and configured to extend from the attachment portion to a second direction perpendicular to the first direction. When a direction perpendicular to both the first direction and the second direction is defined as a third direction, a length of the main body portion in a direction along the third direction (Continued)

is greater than a length of the attachment portion in a direction along the third direction.

10 Claims, 18 Drawing Sheets

(51) Int. Cl.
*E05B 3/00* (2006.01)
*E05B 65/00* (2006.01)
*E05C 1/00* (2006.01)
*E05C 1/04* (2006.01)

(52) U.S. Cl.
CPC .......... *E05B 65/0035* (2013.01); *E05C 1/004* (2013.01); *E05C 1/04* (2013.01)

(56) References Cited

U.S. PATENT DOCUMENTS

| | | | | | |
|---|---|---|---|---|---|
| 137,211 | A | * | 3/1873 | Jones | E05C 1/10 292/DIG. 31 |
| 152,009 | A | * | 6/1874 | Robinson | E05B 65/0864 292/175 |
| 329,494 | A | * | 11/1885 | Schweinfurt | E05C 1/10 292/175 |
| 451,638 | A | * | 5/1891 | Lau | E05B 65/0864 292/175 |
| 467,618 | A | * | 1/1892 | Gross | E05C 1/10 292/175 |
| 513,418 | A | * | 1/1894 | Richter | E05C 1/10 49/450 |
| 513,805 | A | * | 1/1894 | Mann | E05C 1/10 292/175 |
| 543,226 | A | * | 7/1895 | Atwood | E05C 1/10 292/277 |
| 593,182 | A | * | 11/1897 | Woodbury | E05C 1/10 292/DIG. 40 |
| 937,348 | A | * | 10/1909 | Wheelock | E05B 65/0864 292/341.17 |
| 971,569 | A | * | 10/1910 | Shearer | E05C 1/10 292/DIG. 20 |
| 1,152,116 | A | * | 8/1915 | Magoveny | E05B 65/0864 292/DIG. 19 |
| 1,180,943 | A | * | 4/1916 | Prazmo | E05B 63/20 292/153 |
| 1,187,751 | A | * | 6/1916 | Lotz | E05B 65/0864 292/174 |
| 1,205,061 | A | * | 11/1916 | Thull | E05B 65/0864 292/175 |
| 1,337,401 | A | * | 4/1920 | Heberling | E05B 41/00 40/907 |
| 1,347,799 | A | * | 7/1920 | Fryer | E05C 1/10 292/175 |
| 1,521,572 | A | * | 12/1924 | Hammer | E05C 1/10 292/149 |
| 1,564,691 | A | * | 12/1925 | Langdon | E05C 1/10 292/76 |
| 2,518,207 | A | * | 8/1950 | Wagner | E05C 1/10 70/451 |
| 2,714,030 | A | * | 7/1955 | Gardner | E05C 1/10 292/DIG. 20 |
| 4,195,867 | A | * | 4/1980 | Baillie | E05C 1/10 70/81 |
| 4,690,445 | A | * | 9/1987 | Hartley | E05B 15/0205 292/87 |
| 4,746,152 | A | * | 5/1988 | Willcox | E05B 63/128 292/341.15 |
| 4,791,756 | A | * | 12/1988 | Simpson | E05C 1/10 D8/341 |
| 5,042,854 | A | * | 8/1991 | Huang | E05C 1/10 292/163 |
| 5,603,184 | A | * | 2/1997 | Campbell | E05C 1/04 292/145 |
| 6,684,570 | B1 | * | 2/2004 | Robledo | E05B 65/0035 292/147 |
| 2006/0226660 | A1 | * | 10/2006 | Wu | E05B 41/00 292/145 |
| 2009/0300988 | A1 | * | 12/2009 | Bem | E05B 65/0035 70/101 |
| 2016/0230431 | A1 | * | 8/2016 | Yonekura | E05C 19/188 |
| 2024/0125156 | A1 | * | 4/2024 | Guest | E05C 1/10 |

FOREIGN PATENT DOCUMENTS

| | | | | | |
|---|---|---|---|---|---|
| GB | 165643 | A | * | 7/1921 | ............... E05C 1/10 |
| GB | 2195142 | A | * | 3/1988 | ............ E05B 63/128 |
| GB | 2212847 | A | * | 8/1989 | ......... E05B 17/0062 |
| GB | 2219032 | A | * | 11/1989 | ............. E05B 41/00 |
| JP | S53-30496 | U1 | | 3/1978 | |
| JP | S58-21880 | Y2 | | 5/1983 | |
| JP | 2008-150883 | A | | 7/2008 | |
| JP | 5864806 | B1 | | 2/2016 | |
| JP | 2019-27100 | A | | 2/2019 | |
| WO | 2008090447 | A2 | | 7/2008 | |

OTHER PUBLICATIONS

Written Opinion for corresponding Application No. PCT/JP2021/010333, mailed Jun. 1, 2021.

* cited by examiner (a) (b)

DR4 ← → DR2

LOCK KNOB ATTACHMENT, LAVATORY DOOR, AND METHOD FOR MOUNTING LOCK KNOB ATTACHMENT

TECHNICAL FIELD

The present invention relates to a lock knob attachment, a lavatory door, and a method for attaching the lock knob attachment.

BACKGROUND ART

Infectious diseases, such as coronaviruses, often spread via door handles and handrails that are used by large numbers of unspecified people. For example, when an uninfected person touches a door handle or the like that was operated by an infected person who touched it directly with their hand or fingers, there is a high likelihood that the virus adheres to the hands or fingers of the uninfected person. When this uninfected person touches their own mouth, nose, eyes or the like with their hands or fingers to which the virus has adhered, the virus may invade their body, and the uninfected person may suffer from the infectious disease.

Therefore, in order to prevent infectious diseases, it is effective to reduce the number of places that large numbers of unspecified people touch directly with their hands or fingers.

Accordingly, there is a technique disclosed in Patent Document 1 that relates to an equipment that a user can use without touching a door or the like when entering or exiting a bathroom.

Patent Document 1 discloses "a toilet unit including an airtight room with a doorway, a toilet booth installed in the airtight room, a door that opens and closes the doorway, a doorway opening/closing device that opens the door when a mat sensor installed on an entrance floor is stepped on, an air curtain generation device that operates in conjunction with the opening of the door by the doorway opening/closing device and creates an air curtain by an airflow flowing downward from a top of the doorway, and a plasma generation device that mixes plasma into the airflow."

CITATION LIST

Patent Document

[Patent Document 1] Japanese Patent No. 5,864,806 B

DISCLOSURE OF THE INVENTION

Problems to be Solved by the Invention

However, the technique of Patent Document 1 requires construction of a floor surface for installation of the equipment, such that the burden of installation is heavy. In addition, when installing on existing equipment, it is difficult to utilize the existing equipment having mechanical door locks and the like, and full-scale renovation becomes necessary.

It is therefore an object of the present invention to provide a technique that enables a user to lock or unlock the door without using their fingers or hands.

Means of Solving the Problems

In order to solve the problems mentioned above, a lock knob attachment according to some embodiments includes an attachment portion that can be attached to a lock bar that locks a door by sliding in a first direction, and a main body portion that is coupled to the attachment portion and that extends from the attachment portion to a second direction perpendicular to the first direction. When a direction perpendicular to both the first direction and the second direction is defined as a third direction, a length of the main body portion in a direction along the third direction is greater than a length of the attachment portion in the direction along the third direction.

Further, a lavatory door according to some embodiments includes the lock knob attachment mentioned above, a door panel that can be attached to a first wall of a lavatory rotatably around a door hinge axis, a handle portion arranged on the door panel, and the lock bar. The door panel includes a long hole portion in which the attachment portion is moved in sliding motion.

A method for attaching a lock knob attachment according to some embodiments is a method for attaching the lock knob attachment to a lavatory door. The door includes a door panel attached to a first wall of a lavatory rotatably around a door hinge axis and having a long hole portion, and a lock bar including a base portion arranged inside the door panel, and an engagement portion engaged to a second wall of the lavatory, the lock bar capable of changing positions from an unlocked position retracted from the second wall to a locked position engaged with the second wall by sliding in a first direction. The lock knob attachment includes an attachment portion that can be attached to the lock bar and movable along the long hole portion in a sliding motion, and a main body portion that is coupled to the attachment portion and that extends from the attachment portion to a second direction perpendicular to the first direction. When a direction perpendicular to both the first direction and the second direction is defined as a third direction, a length of the main body portion in a direction along the third direction is greater than a length of the attachment portion in a direction along the third direction. The method for attaching the lock knob attachment includes a step of inserting the attachment portion to the long hole portion by moving the attachment portion in a direction toward the lock bar, and a step of fixing the attachment portion to the lock bar via a fastening member.

Effects of the Invention

According to the present invention, it is possible to provide a method that enables a user to lock and unlock the door without using their fingers or hands.

Problems, configurations and effects other than those described above will be made clear by the following description of embodiments.

DESCRIPTION OF EMBODIMENT(S)

Figure 1:
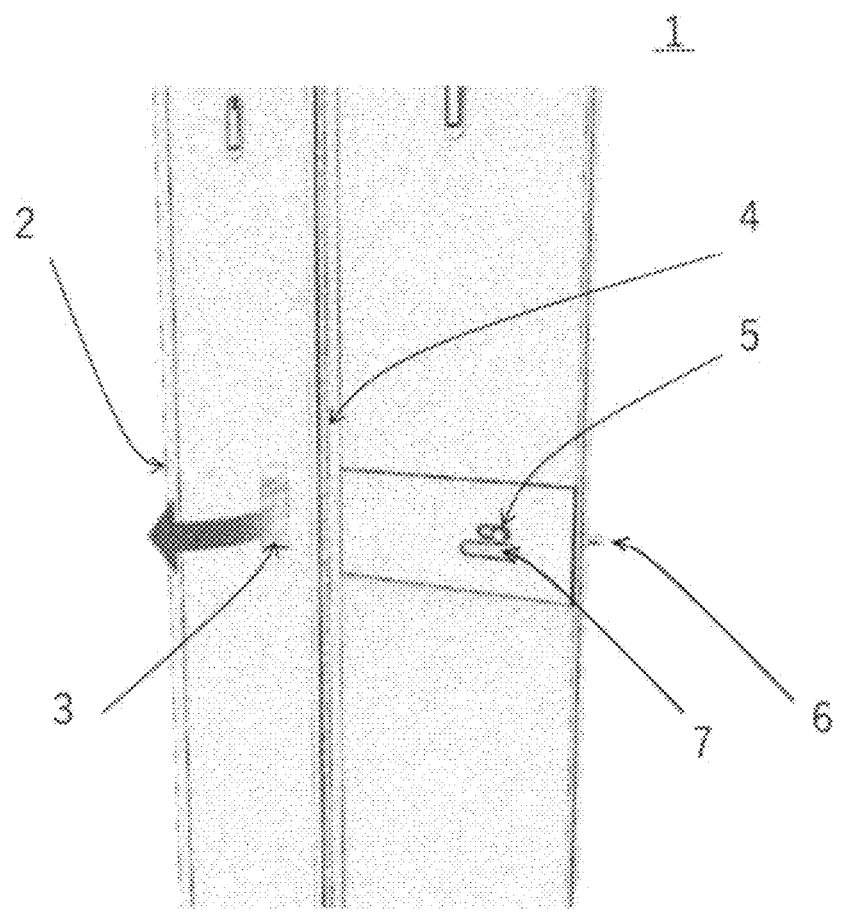
FIG. 1 is a view illustrating a conventional bifold door.

Hereinafter, a lock knob attachment 60, a lavatory door 1, and a method for attaching the lock knob attachment 60 according to embodiments will be described with reference to the drawings. It should be noted that, in the following description of the embodiments, parts and members having the same functions are denoted by the same reference numerals, and redundant descriptions of parts and members denoted by the same reference numerals are omitted.

In the present disclosure, a "handle" is a member that applies a force with a hand or fingers to open or close a door, and is a member that can be provided in a space in which a part of the door is recessed, or provided so as to protrude from the door.

A "door hinge" refers to a member that is rotatably attached to the wall surface of an opening portion in which a door is installed. Also, a "door hinge axis" refers to the rotation axis of the door attached by the door hinge. The door hinge axis is substantially parallel to the vertical direction if the rotation axis of the door is vertical, but in cases in which the door is movable in the vertical direction, the door hinge axis may be substantially parallel to the horizontal direction.

Further, a "door" of the present disclosure is meant to include a door constructed of a panel including a single plane or curved surface, a bifold door configured to fold midway along a second door hinge axis, or a door having a bellows-like extendable panel.

In addition, a "lock knob" refers to a protruding member (for example, a rod-shaped member) that protrudes from the door toward the room direction in order to lock or unlock the door, and the locking position and the unlocking position can be switched by moving the protruding member.

In the present disclosure, a direction toward which the lock bar moves from an unlocked position toward a locked position is defined as a first direction DR1. In the present disclosure, a direction perpendicular to the first direction DR1 is defined as a second direction DR2. The second direction DR2 is a direction from an attachment portion of the lock knob attachment toward a main body portion of the lock knob attachment. Typically, the second direction DR2 is a direction perpendicular to a principal surface of a door panel 10. In the present disclosure, a direction perpendicular to both the first direction DR1 and the second direction DR2 is defined as a third direction DR3. Typically, the third direction DR3 is a direction parallel to the door hinge axis.

Conventional Example

First, with reference to FIG. 1, a description will be given of an outline of a conventional door structure. FIG. 1 illustrates an example of a bifold door 1 having a center-folding structure for use in a bathroom of an aircraft or the like, as seen from the inside of the bathroom. The bifold door 1 is rotatably mounted to a wall (not illustrated in the figure) in an aircraft by a door hinge axis 2, and is designed so that it can be folded at a center-folding portion 4 (in other words, a second door hinge axis). When opening the bifold door 1 from the outside of the bathroom, the door can be opened simply by pushing it with the hand, arm, or elbow. However, in order to open the bifold door 1 from the inside of the bathroom, it is necessary to pull a handle portion 3 toward the user with their hand or fingers.

In addition, when locking the bifold door 1, it is necessary to slide a lock knob 5 in a lateral direction to reliably protrude a lock portion 6 to a wall member side of the aircraft. In addition, when unlocking the bifold door 1, on the contrary, it is necessary to slide the lock knob 5 in the lateral direction and reliably pull in the lock portion 6 from the wall member side of the aircraft.

It should be noted that when the lock knob 5 is operated in the lateral direction, the unlocked state and the locked state are displayed on an outer surface of the bathroom on a display unit 7.

Accordingly, when entering and leaving the room, it is necessary for the user to operate the handle portion 3 and the lock knob 5 using their fingers or hands. However, since aircraft bathrooms have hand-washing facilities within the bathroom, it is necessary for the user to touch the handle portion 3 and the lock knob 5 after washing their hands, so from the viewpoint of preventing infectious diseases, it is desirable to enable the door to be opened and closed without using fingers or hands.

(Handle Attachment 20 According to First Embodiment)

Figure 2:
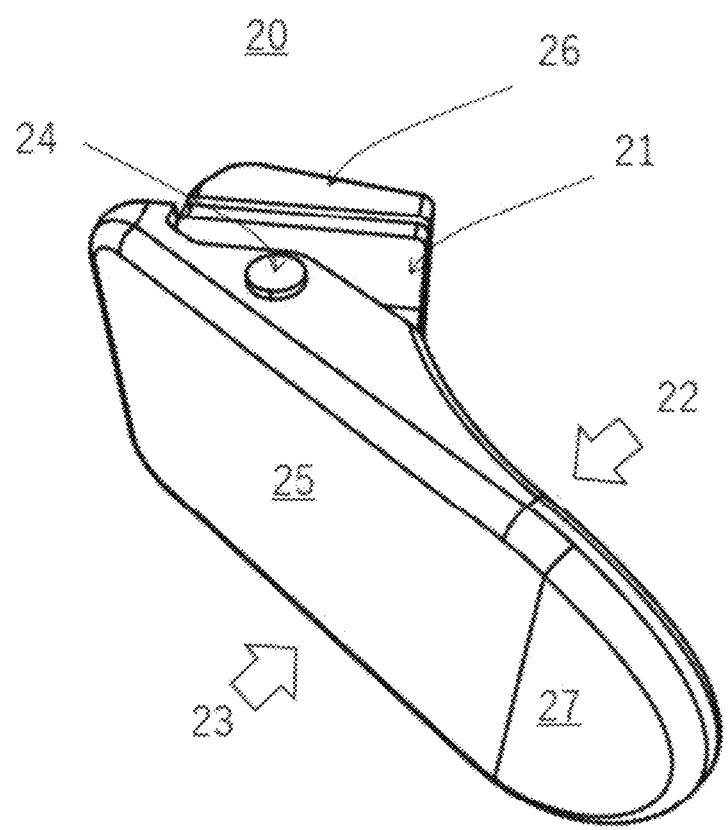
FIG. 2 is a schematic view of a handle attachment according to a first embodiment.

FIG. 2 is a schematic view of a handle attachment. A handle attachment 20 includes a base portion 21 and a flap portion 25. The handle attachment 20 may include an auxiliary base portion 26 that can be coupled to the base portion 21 in order to sandwich the door between the base portion 21 and the auxiliary base portion 26. The base portion 21 is fixed to a wall surface of the door using a fixing member such as a screw. In addition, the flap portion 25 is rotatably attached to the base portion 21 via a flap rotation mechanism 24 such as a pin member.

The flap rotation mechanism 24 is provided on a door wall surface side 22 of the flap portion 25. In addition, the flap portion 25 has a laterally long surface that is substantially perpendicular to the door hinge axis on an opposite side 23 of the door wall surface side.

Further, the flap portion 25 is biased against the base portion 21 using a member such as a spring so that a distal end portion 27 on the far side from the flap rotation mechanism 24 leaves away from the wall surface of the door.

(Lock Knob Attachment 60 According to First Embodiment)

Figure 3:
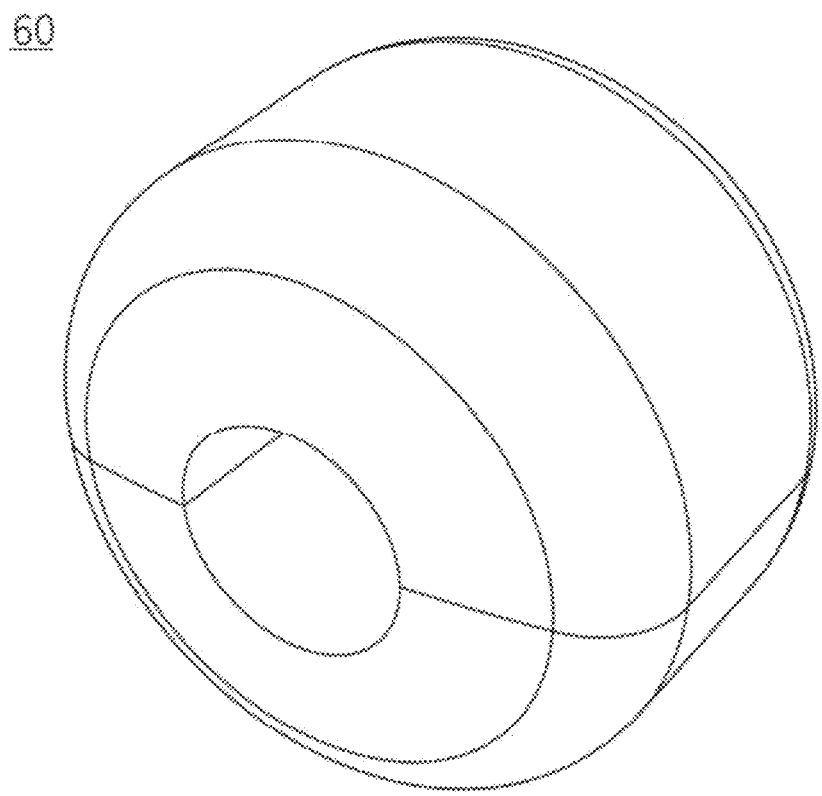
FIG. 3 is a perspective view of a lock knob attachment according to a first embodiment.
Figure 4:
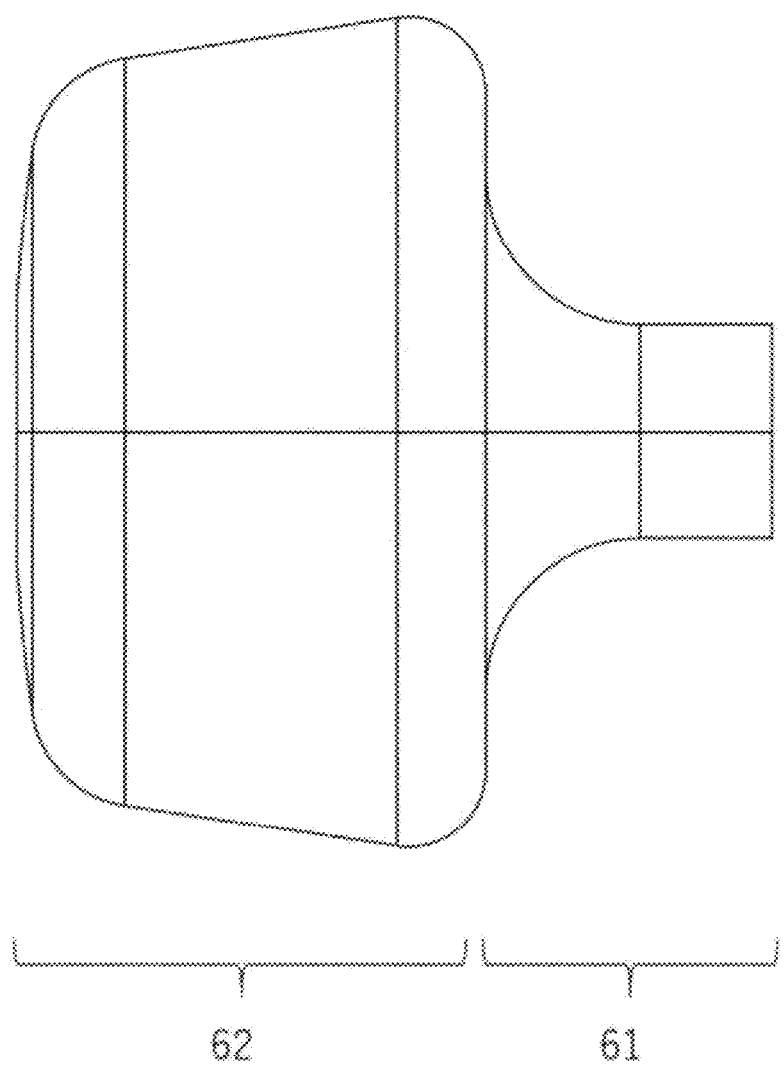
FIG. 4 is a side view of the lock knob attachment.

FIG. 3 is a perspective view of a lock knob attachment 60, and FIG. 4 is a side view of the lock knob attachment 60. The lock knob attachment 60 is an attachment that can be attached to the lock knob 5. As illustrated in FIG. 3 and FIG. 4, the lock knob attachment 60 includes an attachment portion 61 that has a cavity that is capable of being engaged with the lock knob 5, and a main body portion 62 that has a larger outer diameter than the attachment portion that protrudes from the attachment portion 61 in a normal direction of the door surface (refer to FIG. 4).

<Operation of Lock Knob Attachment>

Next, with reference to FIG. 5 an operation when the lock knob attachment 60 is installed on the bifold door 1 will be described.

Figure 5:
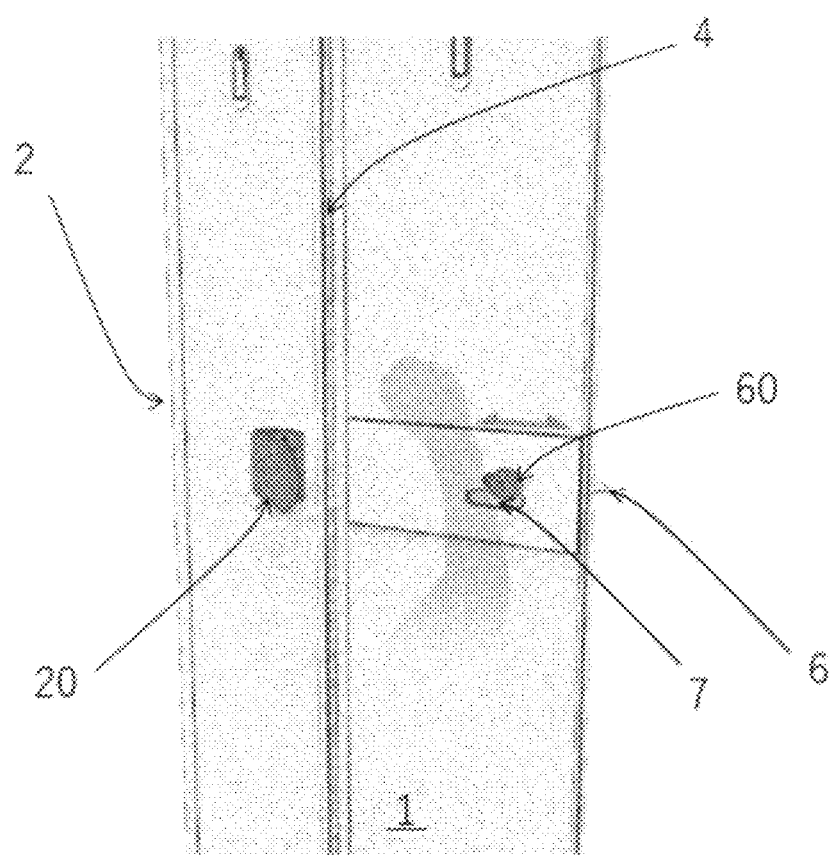
FIG. 5 is a view illustrating an operation using the lock knob attachment.

FIG. 5 illustrates a state in which the bifold door 1 to which the handle attachment 20 and the lock knob attachment 60 are attached is closed. In order to unlock or lock the door from such a state, as depicted in the figure, an arm or elbow may be placed on the lock knob attachment 60, and the lock knob attachment 60 may be laterally moved in the direction of the arrow in the figure, that is, a direction away from the door hinge axis 2 or in a direction that approaches the door hinge axis 2.

In the lock knob attachment 60 according to the present embodiment, the diameter of the main body portion 62 is larger than that of the attachment portion 61 so that the door of the bathroom can be easily locked by an arm, elbow or the like.

In addition, so as not to be mistaken for a door handle and gripped, the tip of the main body portion 62 has a small diameter and a trapezoidal cross section. However, the shape of the lock knob attachment 60 is not necessarily limited to such a shape.

Figure 6:
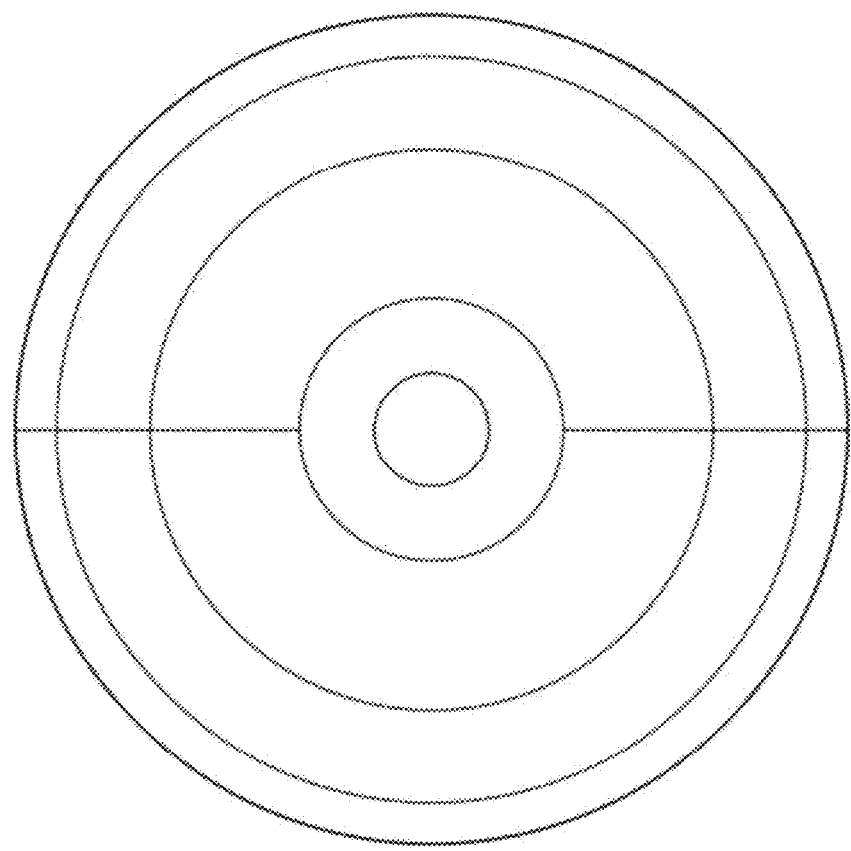
FIG. 6 is a front view of the lock knob attachment.
Figure 7:
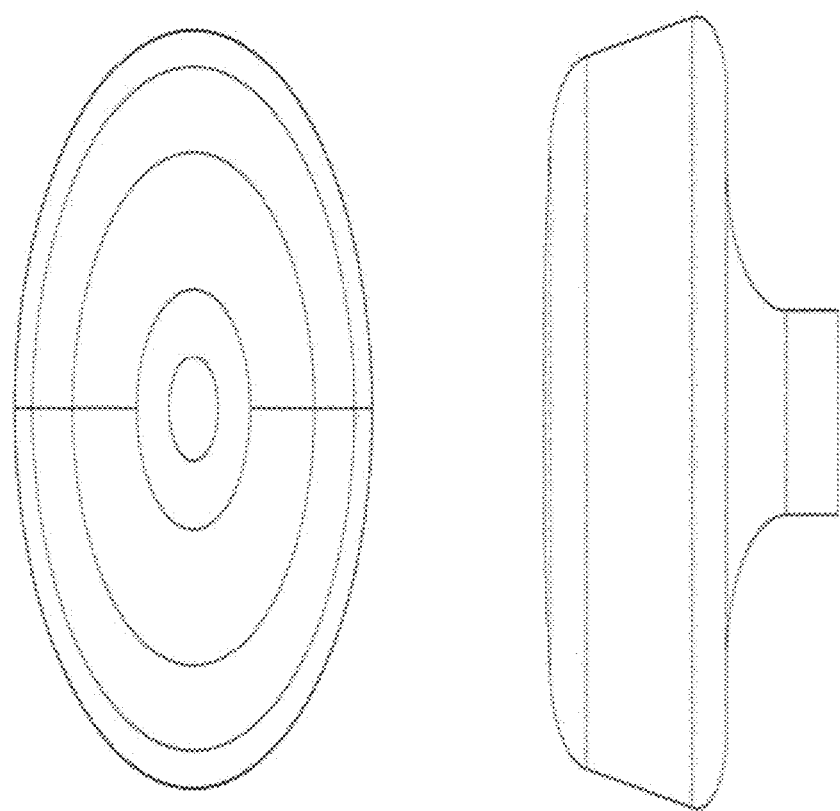
FIG. 7 is a front view and a side view of a modified example of the lock knob attachment.

FIG. 6 is a front view of the lock knob attachment 60. Further, a shape of the front side of the lock knob attachment 60 described above is circular, but the front shape is not limited to the circular shape. For example, as illustrated in a front view of FIG. 7A and a side view of FIG. 7B, the lock knob attachment 60 can have a vertically long front shape (more specifically, an elliptical or oval shape) so that force can be easily applied when the user uses the arm or elbow to move the lock knob attachment 60 to the horizontal direction.

In the present embodiment, a door that opens and closes in the horizontal direction has been described, but the above-mentioned lock knob attachment is not limited to a door that opens and closes in the horizontal direction, and it can be applied to a door that opens and closes in the vertical direction, such as a door of a luggage storage space in an aircraft. Further, the lock knob attachment can be applied to various areas, such as a lock portion of doors in facilities such as galleys.

Second Embodiment

Figure 8:
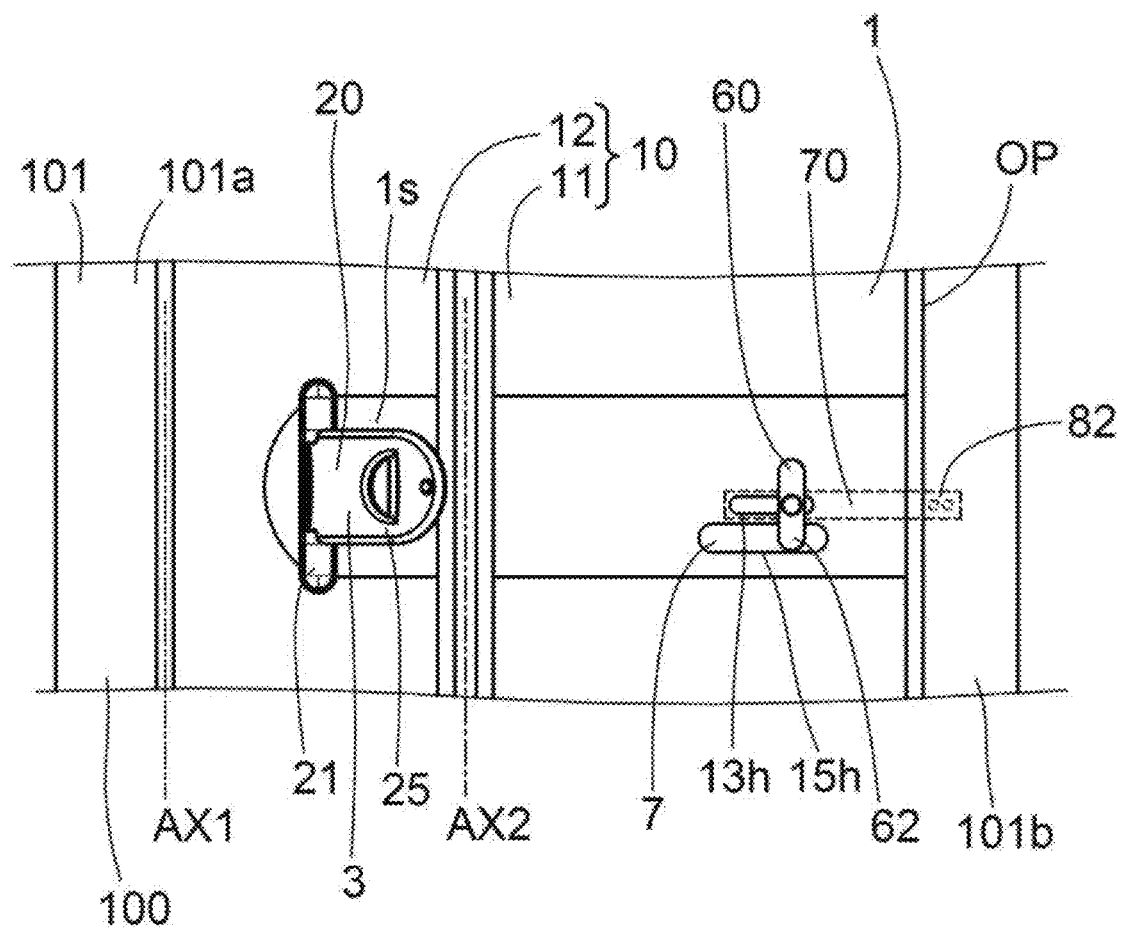
FIG. 8 is a schematic front view schematically illustrating a lavatory door according to a second embodiment.
Figure 9:
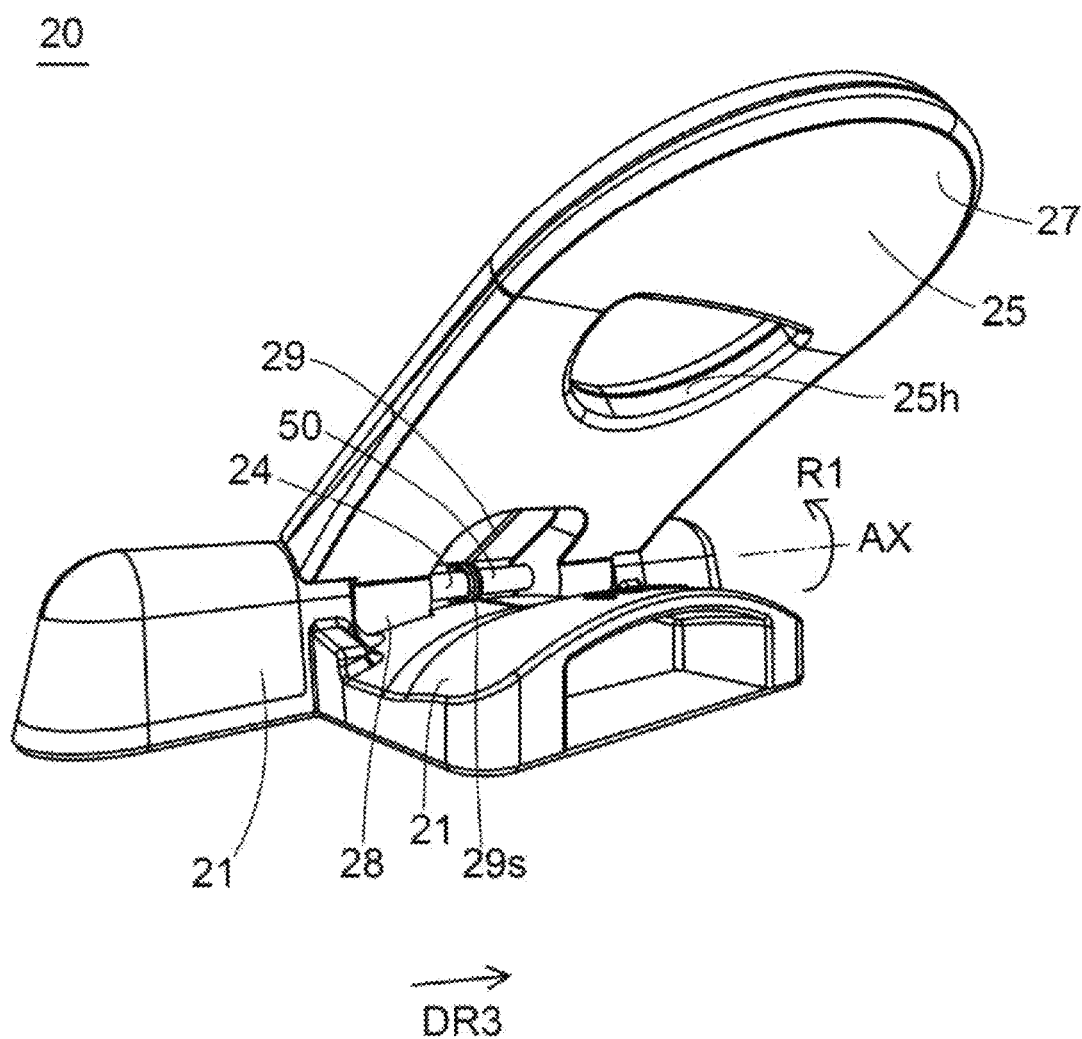
FIG. 9 is a schematic perspective view schematically illustrating an example of a handle attachment.
Figure 10:
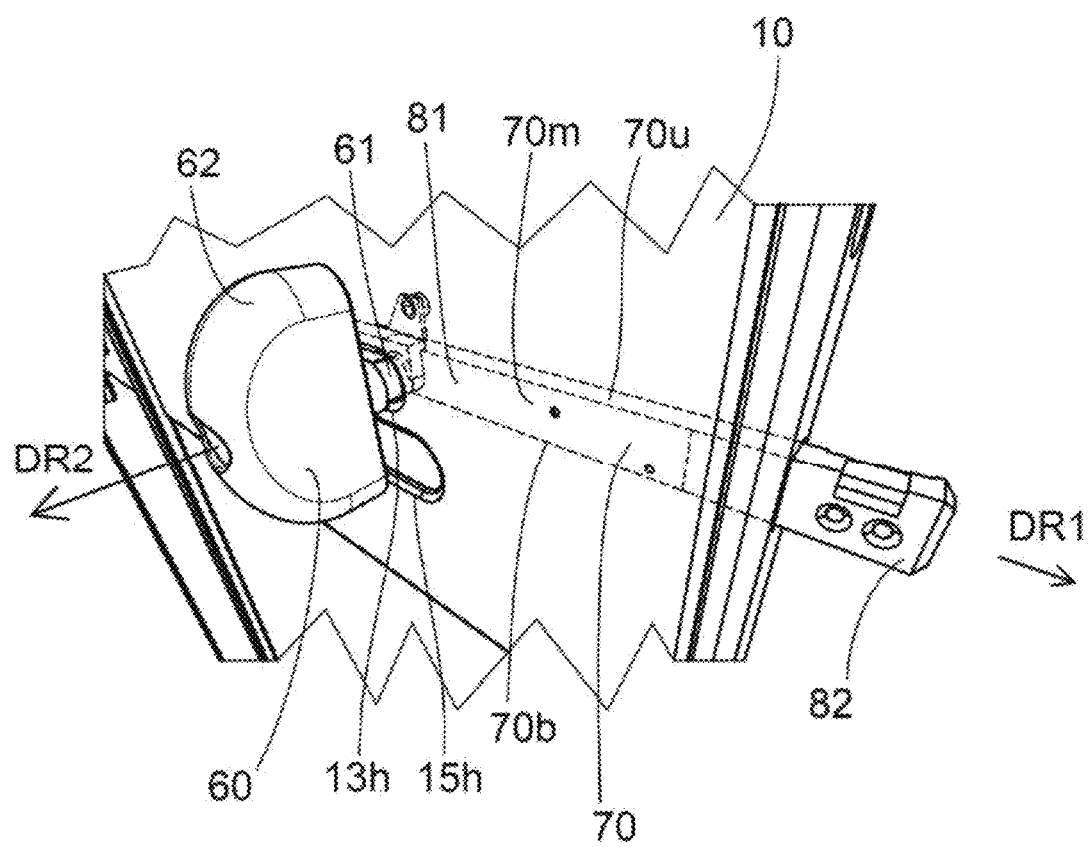
FIG. 10 is a schematic perspective view schematically illustrating a state after the lock knob attachment has been fixed to a lock bar.
Figure 11:
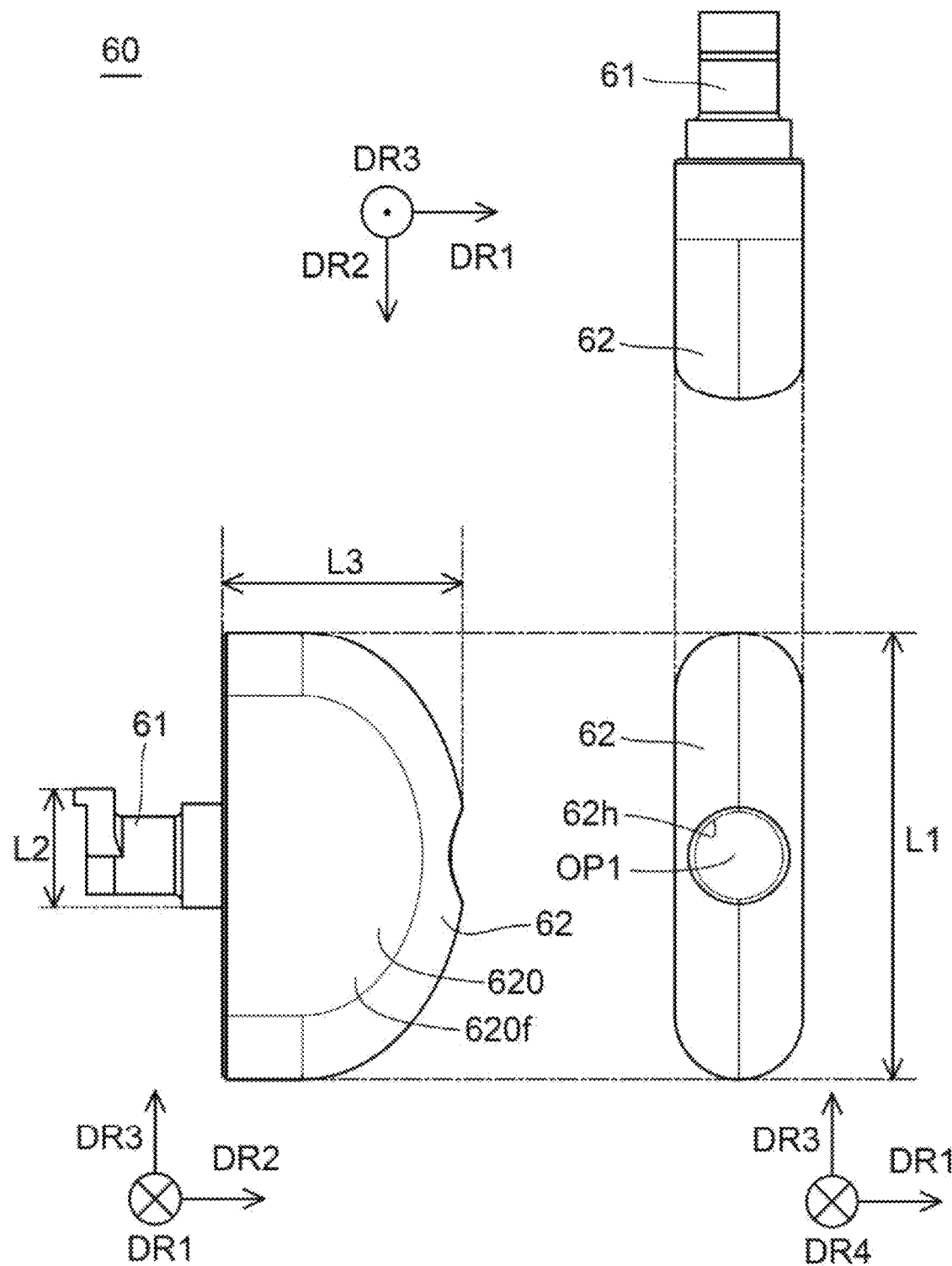
FIG. 11 is a three-side view schematically illustrating a lock knob attachment according to the second embodiment.
Figure 12:
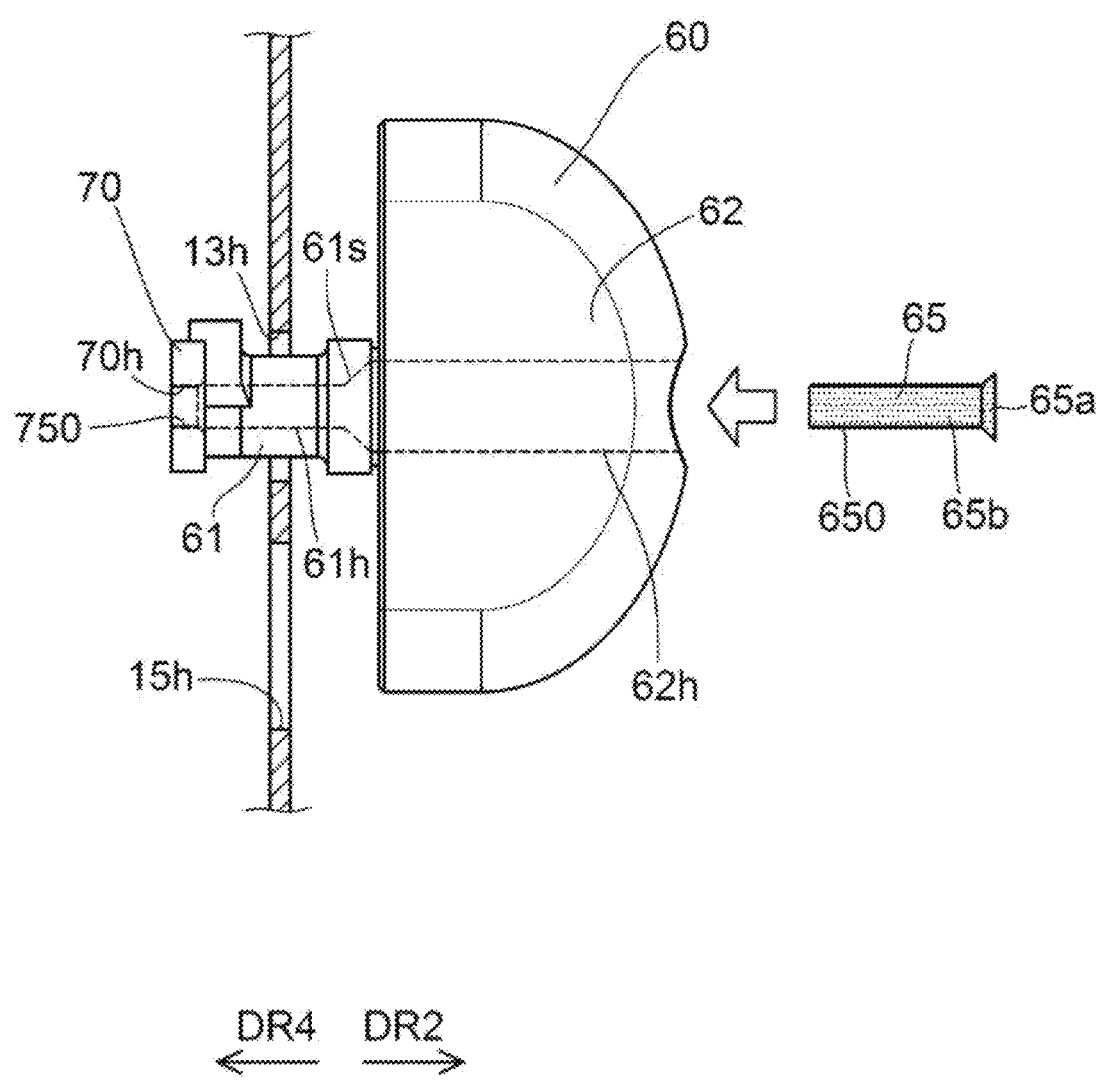
FIG. 12 is a view schematically illustrating a state before the lock knob attachment is fixed to the lock bar.
Figure 13:
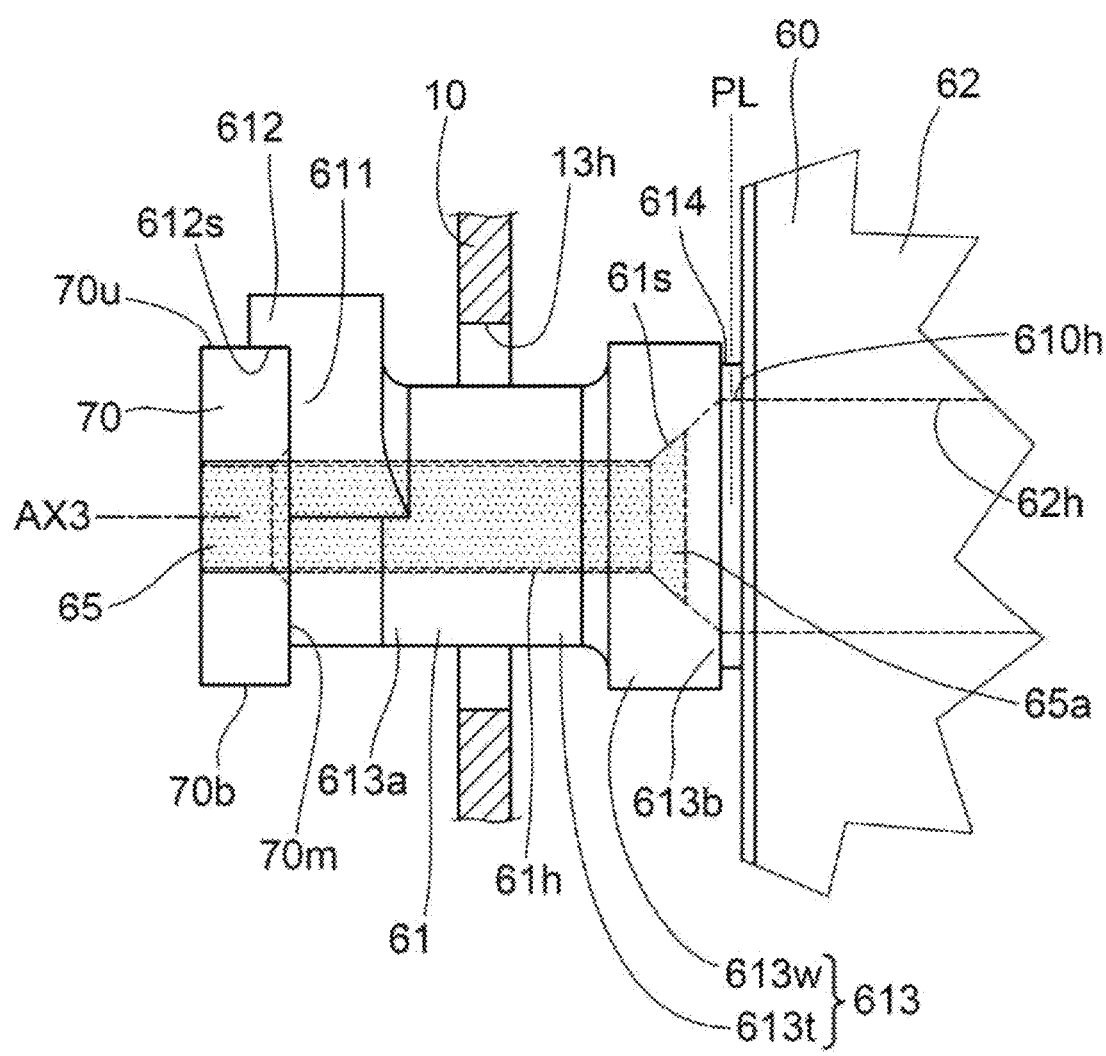
FIG. 13 is a view illustrating in enlarged view one portion of the lock knob attachment fixed to the lock bar.
Figure 14:
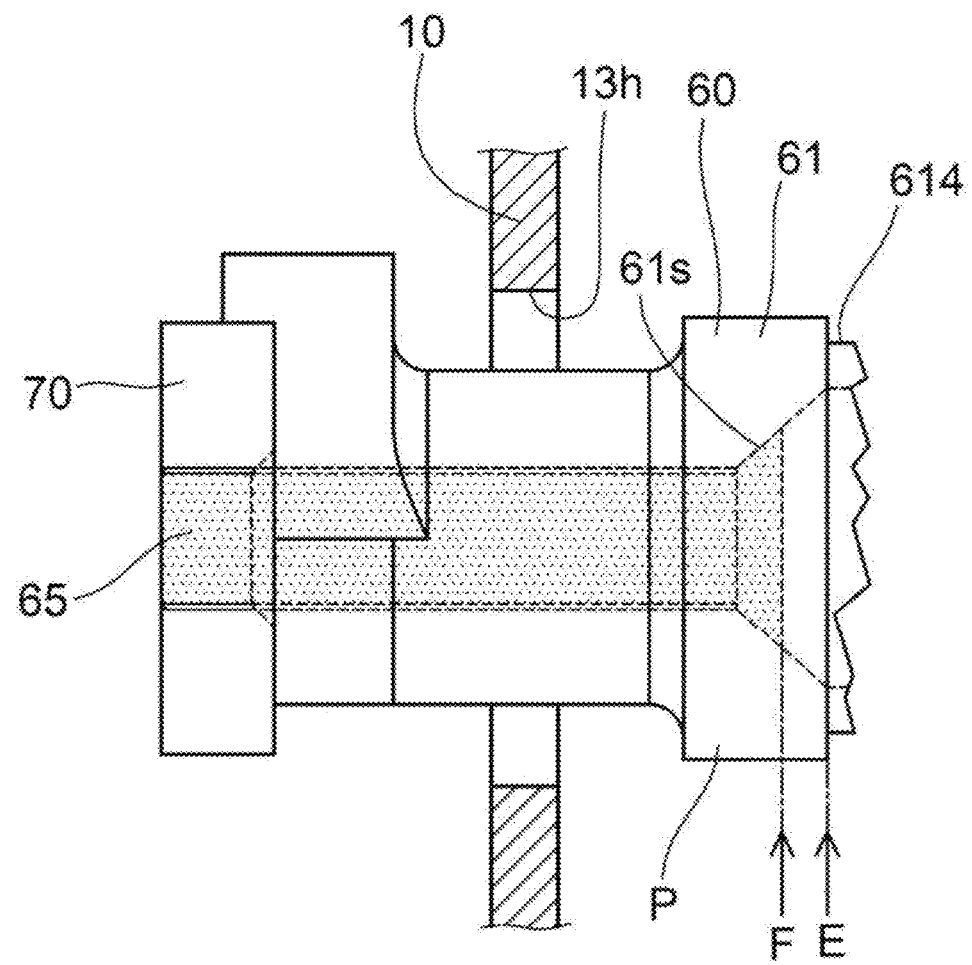
FIG. 14 is a view schematically illustrating a state where an attachment portion of the lock knob attachment is ruptured at a weakened portion.
Figure 14:
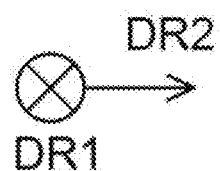

Referring to FIG. 8 through FIG. 17, the lock knob attachment 60, a lavatory door 1, and a method for attaching the lock knob attachment 60 according to the second embodiment will be described. FIG. 8 is a schematic front view schematically illustrating the lavatory door 1 according to the second embodiment. FIG. 9 is a schematic perspective view schematically illustrating one example of a handle attachment 20 according to the second embodiment. FIG. 10 is a schematic perspective view schematically illustrating a state after the lock knob attachment 60 has been fixed to a lock bar 70. FIG. 11 is a schematic three-side view schematically illustrating the lock knob attachment 60 according to the second embodiment. A schematic plan view is illustrated on an upper side of FIG. 11, a schematic front view is illustrated on a lower right side of FIG. 11, and a schematic side view is illustrated on a lower left side of FIG. 11. FIG. 12 is a view schematically illustrating a state before the lock knob attachment 60 is fixed to the lock bar 70. FIG. 13 is an enlarged view of a part of the lock knob attachment 60 fixed to the lock bar 70. FIG. 14 is a view schematically illustrating a state in which the attachment portion 61 of the lock knob attachment 60 is ruptured at a weakened portion 614. FIG. 15 through FIG. 18 are views schematically illustrating a state where a step of the method for attaching the lock knob attachment 60 is being executed.

In the second embodiment, the points that differ from the first embodiment are primarily described, and redundant descriptions of the matters described in the first embodiment will be omitted. Accordingly, even if not explicitly described with respect to the second embodiment, it is needless to say that the matters described with respect to the first embodiment can be adopted in the second embodiment.

(Lavatory Door 1)

As illustrated in FIG. 8, the lavatory door 1 is attached to a wall 101 (more specifically, the wall of the lavatory unit of an aircraft). Door 1 opens and closes an opening portion OP defined by the wall 101.

In the example described in FIG. 8, the door 1 includes a door panel 10, the handle portion 3, the lock bar 70, and the lock knob attachment 60.

The door panel 10 is rotatably attached to a first wall 101$a$ of a lavatory 100 around a door hinge axis AX1. The door panel 10 may be formed of one panel or a plurality of panels including a first panel 11 and a second panel 12.

In the example illustrated in FIG. 8, the first panel 11 and the second panel 12 are connected so as to be relatively rotatable around a second door hinge axis AX2. In other words, the door 1 in FIG. 8 is a bifold door.

In the example illustrated in FIG. 8, the door panel 10 (more specifically, the first panel 11) has an elongated hole portion 13$h$ in which the attachment portion 61 of the lock knob attachment 60 can be slidably moved. The main body portion 62 of the lock knob attachment 60 is arranged on the front side of the elongated hole portion 13$h$, and the lock bar 70 is arranged on the back side of the elongated hole portion 13$h$.

In the example described in FIG. 8, the door panel 10 (more specifically, the first panel 11) has a second elongated hole portion 15$h$ parallel to the elongated hole portion 13$h$. A lock state display portion 7 is arranged on the back side of the second elongated hole portion 15$h$. The lock state display portion 7 selectively displays, on the outer surface of the bathroom, a first display indicating that the door 1 is in the locked state and a second display indicating that the door 1 is in the unlocked state.

The handle portion 3 is a part operated by the user when opening the door 1. In the example illustrated in FIG. 8, the handle portion 3 is arranged on the door panel 10 (more specifically, the second panel 12).

The handle portion 3 can include the handle attachment according to the first embodiment, or can include a handle attachment that differs from the handle attachment according to the first embodiment. Alternatively, the handle portion 3 can be a known handle portion as illustrated in FIG. 1.

In the example illustrated in FIG. 9, the handle attachment 20 includes a base portion 21, a flap portion 25, a flap rotation mechanism 24 (more specifically, a pin member 50), and a biasing member 29.

The base portion 21 is attached to a part of a wall surface 1s of the door 1. In the example illustrated in FIG. 8, the base portion 21 is attached to the door panel 10.

The flap portion 25 is pulled by the user to apply a pulling force to the door 1 (more specifically, to the door panel 10) via the base portion 21. In other words, when the user pulls the flap portion 25, the state of the door 1 is switched from a closed state in which the opening portion OP of the wall 101 is closed to an open state in which the opening portion OP is open. The flap portion 25 functions as a first operation unit operated by the user.

In the example described in FIG. 9, the flap portion 25 has a base end portion 28 connected to a flap rotation mechanism 24 (more specifically, a pin member 50) and a distal end portion 27 arranged at a position separated from the flap rotation mechanism 24. The flap portion 25 preferably has a laterally elongated shape in which the length in a direction perpendicular to a rotation axis AX of the flap portion 25 is longer than the length in the direction parallel to the rotation axis AX of the flap portion 25.

In the example illustrated in FIG. 9, the biasing member 29 biases the flap portion 25 with respect to the base portion 21 in a first rotational direction R1 around the rotation axis AX. The first rotation direction R1 is a direction in which the distal end portion 27 of the flap portion 25 separates from the wall surface of the door 1. In the example illustrated in FIG. 9, the biasing member 29 is a torsion coil spring 29s. In the example illustrated in FIG. 9, the pin member 50 is inserted into a coil portion of the torsion coil spring 29s. In addition, one end portion of the torsion coil spring 29s comes into contact with the base portion 21, and the other end portion of the torsion coil spring 29s comes into contact with the flap portion 25. From the viewpoint of safety, it is preferable that one end portion and/or the other end portion of the torsion coil spring 29s is accommodated in a groove or a hole.

In the example illustrated in FIG. 9, the distal end portion 27 of the flap portion 25 is biased in a direction away from the wall surface of the door 1. In this case, (1) a first effect of making it easy to insert an arm or elbow between the distal end portion 27 and the wall surface of the door 1 and (2) a second effect of having the distal end portion 27 retract toward the wall surface side of the door 1 when the distal end portion 27 is unintentionally hit by a part of a body or a wall of the lavatory are synergistically achieved. The first effect makes it possible to smoothly open the door 1 without touching the flap portion 25 with fingers or hands. In addition, the second effect prevents users from being injured and suppresses damage to the wall or the like.

As illustrated in FIG. 9, the flap portion 25 can have a through-hole portion 25h on which a finger can be hooked. In this case, instead of operating the flap portion 25 by inserting an arm or elbow between the flap portion 25 of the wall surface and the door 1, it is possible to operate the flap portion 25 by hooking a finger on the through-hole portion 25h of the flap portion 25. Accordingly, it is possible to meet both the requests of users who wish to operate the flap portion 25 using their arm or elbow and the requests of users who wish to operate the flap portion 25 using their finger.

In the example illustrated in FIG. 8, the lock bar 70 locks the door by sliding in the first direction DR1. More specifically, the lock bar 70 is capable of changing positions by sliding in the first direction DR1 from an unlocked position in which it is retracted from a second wall 101b of the lavatory to a locked position engaged with the second wall 101b. The second wall 101b is a wall arranged on an opposite side as the first wall 101a with respect to the door 1.

In the example illustrated in FIG. 10, the lock bar 70 includes a base portion 81 and an engagement portion 82. The base portion 81 is arranged inside the door panel 10. The base portion 81 has the attachment portion 61 of the lock knob attachment 60 attached thereto. The engagement portion 82 is capable of being engaged with the second wall 101b. In the example illustrated in FIG. 8, when the lock bar 70 is in the locked position, the engagement portion 82 protrudes toward the second wall 101b from the inside of the door panel 10. Meanwhile, when the lock bar 70 is in the unlocked position, the engagement portion 82 is retracted inside the door panel 10.

In the example illustrated in FIG. 10, the lock bar 70 includes a principal surface 70m, an upper surface 70u, and a lower surface 70b. The principal surface 70m is a surface opposing the elongated hole portion 13h, or a surface facing the second direction DR2 side.

The lock knob attachment 60 is attached to the lock bar 70. The lock knob attachment 60 can be the lock knob attachment according to the first embodiment or a lock knob attachment described later.

(Lock Knob Attachment 60)

Next, an example of the lock knob attachment 60 will be described in further detail with reference to FIG. 8 and FIGS. 10 through 18.

In the example illustrated in FIG. 10, the lock knob attachment 60 is equipped with the attachment portion 61 and the main body portion 62.

The attachment portion 61 is capable of being attached to the lock bar 70 that locks the door 1 (more specifically, the aircraft lavatory door) by sliding in the first direction DR1. The attachment portion 61 is preferably capable of being removed from the lock bar 70 without damaging the lock knob attachment 60 or the lock bar 70. The attachment portion 61 can be made of metal or resin.

In the example illustrated In FIG. 10, the main body portion 62 is coupled to the attachment portion 61. The main body portion 62 extends from the attachment portion 61 to the second direction DR2 (direction perpendicular to the first direction DR1).

In the example illustrated in FIG. 11, a length L1 of the main body portion 62 in a direction parallel to the third direction DR3 is longer than a length L2 of the attachment portion 61 in a direction parallel to the third direction DR3. Since the length L1 is longer than the length L2, the user can lock and unlock the door 1 easily without using their fingers or hands. The length L1 of the main body portion 62 in a direction along the third direction DR3 is preferably 3 cm or more, 4 cm or more, or 5 cm or more.

A length L3 of the main body portion 62 in a direction parallel to the second direction DR2 is preferably 2 cm or more, 3 cm or more, or 4 cm or more. In a case where the length L1 is 3 cm or more and the length L3 is 2 cm or more, the user can lock and unlock the door 1 easily without using their fingers or hands.

An area of the main body portion 62 when viewed in a direction along the first direction DR1 (area of a shadow that is formed when a parallel light parallel to the first direction DR1 is irradiated on the main body portion 62) is preferably 6 cm 2 or more, 10 cm 2 or more, or 15 cm 2 or more.

Next, with reference to FIGS. 1 through 18, an optional configuration that can be added to the second embodiment or the first embodiment described earlier will be described.

(Shape and Material of Main Body Portion 62)

In the example illustrated in FIG. 11, the main body portion 62 has an approximately semicircular shape when viewed in a direction along the first direction DR1. Further, the main body portion 62 has an approximately oval shape when viewed in a direction along an opposite direction DR4 from the second direction DR2. In that case, (1) it is possible to eliminate the corners of the main body portion 62 or to reduce the number of corners of the main body portion 62, (2) it is possible to reduce a visible size of the main body portion 62 (size of the main body portion 62 when viewed in the direction along the opposite direction DR4 from the second direction DR2), (3) increase an area of a portion that is operated by the arm or elbow (area of the main body portion 62 when viewed in the direction along the first direction DR1), and (4) it is possible to enable the user to intuitively recognize that the main body portion 62 is designed to be operated in the direction along the first direction DR1. However, in the present embodiment, the shape of the main body portion 62 is not limited to the shape illustrated in FIG. 11 and can be arbitrary. The shape of the main body portion 62 can be an approximately column shape or an approximately prismatic shape.

In the example illustrated in FIG. 11, the main body portion 62 includes a principal surface 620, and a center portion of the principal surface 620 is a flat surface 620f that is perpendicular to the first direction DR1. When the principal surface 620 of the main body portion 62 includes the flat surface 620f, the load that acts on the arm or elbow when operating the main body portion 62 using the arm or elbow can be dispersed.

The main body portion 62 can be made of metal such as aluminum. Alternatively, the main body portion 62 can be made of resin.

(Through-Hole Portion of Main Body Portion 62 and Attachment Portion 61)

In the example illustrated in FIG. 12, the main body portion 62 includes a first through-hole portion 62h and the attachment portion 61 includes a second through-hole portion 61h. The first through-hole portion 62h and the second through-hole portion 61h preferably respectively extend in a direction parallel to the second direction DR2. In the example illustrated in FIG. 11, when viewed in the direction along the opposite direction DR4 from the second direction DR2, the first through-hole portion 62h is arranged at the center of the main body portion 62. In the example illustrated in FIG. 11, an opening OP1 on the second direction DR2 side of the first through-hole portion 62h is opened. Alternatively, the opening OP1 can be closed by a lid or a cover.

(Fastening Member 65)

According to the example illustrated in FIG. 12, the lock knob attachment 60 includes a fastening member 65 configured to fix the attachment portion 61 to the lock bar 70. The fastening member 65 is inserted to both the first through-hole portion 62h and the second through-hole portion 61h. In a case where the fastening member 65 can be inserted to both the first through-hole portion 62h and the second through-hole portion 61h, the fastening member 65 can reach the lock bar 70 through the through-hole portions (62h, 61h). Thus, the operation of attaching the lock knob attachment 60 to the lock bar 70 using the fastening member 65 is facilitated.

In the example illustrated in FIG. 12, the fastening member 65 is a screw member. The fastening member 65 includes a head portion 65a and a shaft portion 65b with a male screw 650. Further, the lock bar 70 includes a female screw 750 that is screw-engaged with the male screw 650 of the fastening member 65. In the example illustrated in FIG. 12, the attachment portion 61 includes a seat surface 61s that comes into contact with the head portion 65a of the fastening member 65. Alternatively, the seat surface 61s can be provided on the main body portion 62.

(Rotation Stop Portion 612s of Attachment Portion 61)

In the example illustrated in FIG. 13, the attachment portion 61 includes the rotation stop portion 612s. The rotation stop portion 612s prevents the attachment portion 61 and the main body portion 62 from rotating around a longitudinal direction axis AX3 of the fastening member By preventing rotation of the main body portion 62, the user can operate the main body portion 62 stably. Further, by preventing relative rotational motion between the attachment portion 61 (or the seat surface 61s) and the fastening member 65, the loosening of the fastening member 65 is prevented or suppressed.

According to the example illustrated in FIG. 13, the rotation stop portion 612s contacts a surface perpendicular to the principal surface 70m of the lock bar 70. According to the example illustrated in FIG. 13, the rotation stop portion 612s is in contact with the upper surface 70u of the lock bar 70, but the rotation stop portion 612s can be in contact with the lower surface 70b of the lock bar 70. When the rotation stop portion 612s contacts the upper surface 70u or the lower surface 70b of the lock bar, the rotational motion of the attachment portion 61 is effectively prevented. Further, when attaching the attachment portion 61 to the lock bar 70, the rotation stop portion 612s can be used as a positioning portion with respect to the lock bar 70. Further, in a case where the rotation stop portion 612s is in contact with the upper surface 70u of lock bar, the attachment portion 61 will not fall down from the lock bar 70 when attaching the attachment portion 61 to the lock bar 70.

According to the example illustrated in FIG. 13, the attachment portion 61 includes a first portion 611 in contact with the principal surface 70m of the lock bar 70 and a second portion 612 that comes into contact with a second surface (70u) that is perpendicular to the principal surface 70m of the lock bar 70. Further, the second portion 612 includes the rotation stop portion 612s mentioned earlier. In this case, the attachment portion 61 is effectively positioned by the principal surface 70m and the second surface (70u) of the lock bar 70. Further, the positioned state is stably maintained by the rotation stop portion 612s. In the example illustrated in FIG. 13, an abutment portion between the lock bar 70 and the attachment portion 61 when viewed in a direction along the longitudinal direction of the lock bar 70 (in other words, the direction along the first direction DR1) forms an approximately L-shape.

According to the example illustrated in FIG. 13, a hole into which the fastening member 65 is inserted is provided on the first portion 611. Therefore, a contact surface between the first portion 611 and the principal surface 70m forms an annular contact surface.

(Weakened Portion 614 of Attachment Portion 61)

According to the example illustrated in FIG. 13, the attachment portion 61 includes the weakened portion 614 that defines a rupture position of the attachment portion 61. Further, the weakened portion 614 is arranged on the second direction DR2 side than the elongated hole portion 13h of the door panel 10. The weakened portion 614 is, for example, a recess (more specifically, an annular recess) that is provided on an outer circumferential surface of the attachment portion 61.

In the example illustrated in FIG. 13, a plane PL that passes through the weakened portion 614 and is perpendicular to the second direction DR2 traverses the second through-hole portion 61h of the attachment portion 61. In this case, the attachment portion 61 is further easily ruptured at the weakened portion 614. According to the example illustrated in FIG. 13, the second through-hole portion 61*h* includes a part 610*h* that has a greater inner diameter than a maximum outer diameter of the head portion 65*a* of the fastening member 65. The plane PL that passes through the weakened portion 614 and is perpendicular to the second direction DR2 preferably traverses the part 610*h*. In that case, the attachment portion 61 can be further easily ruptured at the weakened portion 614.

A case is assumed where excessive force acts on the main body portion 62 and the attachment portion 61 is ruptured. In that case, as illustrated in FIG. 14, the attachment portion 61 is ruptured at the weakened portion 614. In the example illustrated in FIG. 14, the weakened portion 614 is positioned toward the second direction DR2 side than the elongated hole portion 13*h* of the door panel 10. Therefore, after the attachment portion 61 is ruptured, the user can grip a part P between the elongated hole portion 13*h* and the weakened portion 614 of the attachment portion 61 to operate the lock bar 70. Therefore, the user will not be locked inside the bathroom (more specifically the aircraft lavatory).

According to the example illustrated in FIG. 14, the weakened portion 614 is positioned on the second direction DR2 side than the seat surface 61*s*. Further, the weakened portion 614 is arranged on the second direction DR2 side than the edge of the fastening member 65 on the second direction DR2 side that fixes the attachment portion 61 to the lock bar 70 (refer to the positional relationship between an arrow E illustrating the position of the weakened portion 614 and an arrow F denoting the position of the edge of the fastening member 65 on the second direction DR2 side in FIG. 14). In this case, the rupture of the attachment portion 61 at the weakened portion 614 will not be interfered by the fastening member 65.

(Shaft Portion 613 of Attachment Portion 61)

In the example illustrated in FIG. 13, the attachment portion 61 includes a shaft portion 613. The shaft portion 613 is extended along the second direction DR2. The shaft portion 613 is arranged to traverse the elongated hole portion 13*h*.

In the example illustrated in FIG. 13, the shaft portion 613 includes the second through-hole portion 61*h* that is extended along a longitudinal direction of the shaft portion 613. The fastening member 65 is inserted to the second through-hole portion 61*h*. In the example illustrated in FIG. 13, the shaft portion 613 includes the seat surface 61*s* that comes into contact with the head portion 65*a* of the fastening member 65. In the example illustrated in FIG. 13, the shaft portion 613 includes a small diameter portion 613*t* and a large diameter portion 613*w* that has a larger outer diameter than the small diameter portion 613*t*. Further, the large diameter portion 613*w* is arranged on the second direction DR2 side than the small diameter portion 613*t*. The seat surface 61*s* is provided on an inner side of the large diameter portion 613*w*. Further, the weakened portion 614 is provided on an outer surface of the large diameter portion 613*w*.

According to the example illustrated in FIG. 13, the shaft portion 613 includes a first end portion 613*a* and a second end portion 613*b*. The first part 611 mentioned earlier that comes into contact with the principal surface 70*m* of the lock bar 70 is provided on the first end portion 613*a*. Further, the second end portion 613*b* is connected to the main body portion 62. According to the example illustrated in FIG. 13, the weakened portion 614 mentioned earlier is provided on the second end portion 613*b*.

(Method for Attaching Lock Knob Attachment)

A method for attaching the lock knob attachment according to the present embodiment will be described with reference to FIG. 8 and FIGS. 10 through 18.

The lock knob attachment 60 according to the present embodiment is a method for attaching the lock knob attachment 60 to the lavatory door 1 (more specifically, the aircraft lavatory door).

The lavatory door 1 includes, as illustrated in FIG. 8 and the like, (1) the door panel 10 including the elongated hole portion 13*h* and attached rotatably around the door hinge axis AX1 on the first wall 101*a* of the lavatory 100, and (2) the lock bar 70 that includes the base portion 81 arranged inside the door panel 10 and the engagement portion 82 that can be engaged with the second wall 101*b* of the lavatory 100, the lock bar 70 capable of changing its position from the unlocked position retracted from the second wall 101*b* to the locked position engaged with the second wall 101*b* by sliding in the first direction DR1.

The lavatory door 1 is already described in the aforementioned embodiment, so repetitive descriptions regarding the details of the lavatory door 1 will be omitted.

The lock knob attachment 60 includes, as illustrated in FIG. 10 and the like, (1) the attachment portion 61 that can be attached to the lock bar 70 and that can be moved in sliding motion along the elongated hole portion 13*h*, and (2) the main body portion 62 that can be connected to the attachment portion 61 and that extends from the attachment portion 61 in the second direction DR2 perpendicular to the first direction DR1. (3) When the direction perpendicular to both the first direction DR1 and the second direction DR2 is defined as the third direction DR3, the length of the main body portion 62 in the direction along the third direction DR3 is greater than the length of the attachment portion 61 in the direction along the third direction DR3.

The lock knob attachment 60 is already described in the aforementioned embodiment, so repetitive descriptions regarding the details of the lock knob attachment 60 will be omitted.

Next, the respective steps of the method for attaching the lock knob attachment 60 according to the present embodiment will be described.

Figure 15:
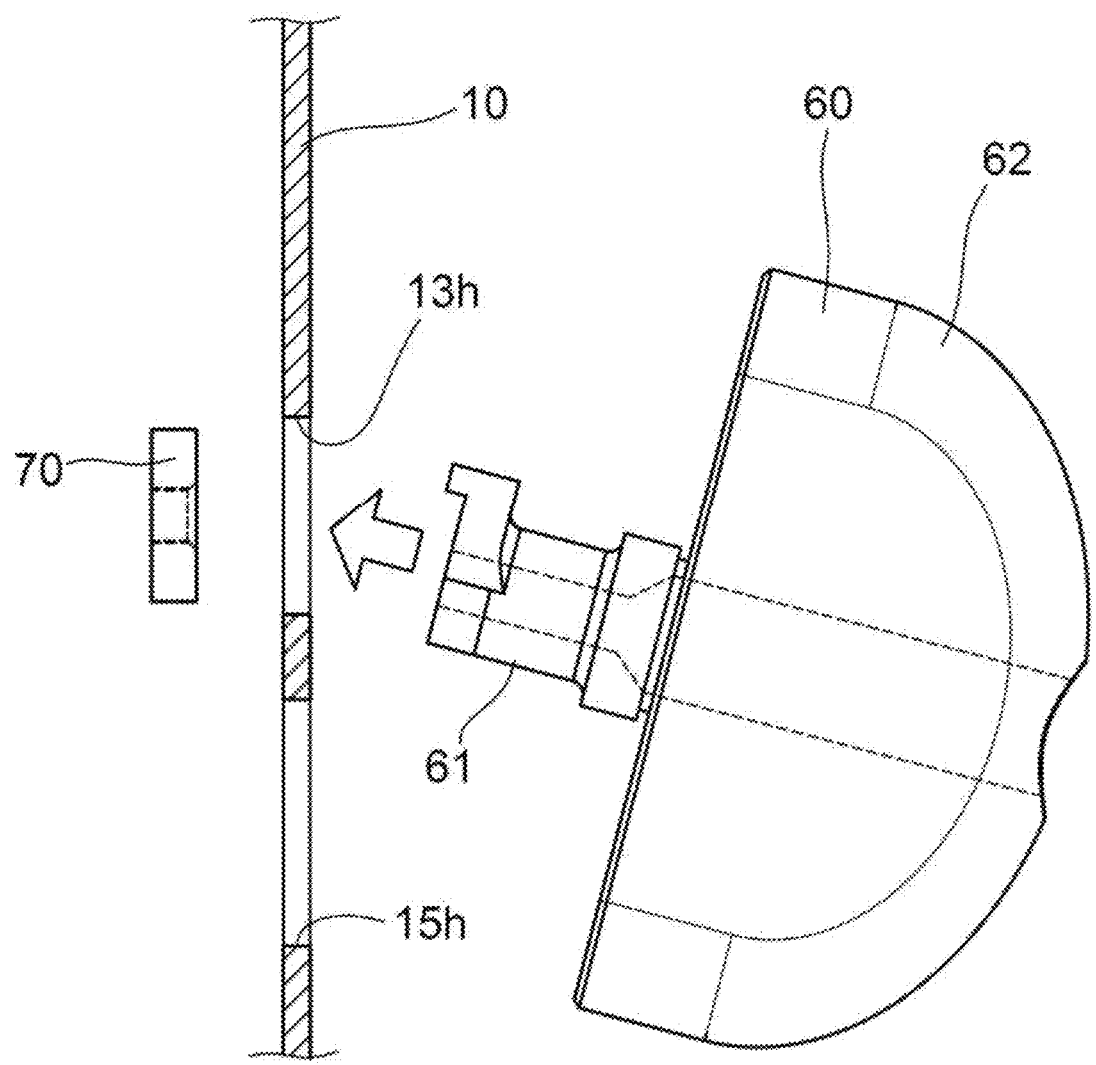
FIG. 15 is a view schematically illustrating a state where one step of a method for attaching the lock knob attachment is being executed.

In a first step ST1, the attachment portion 61 of the lock knob attachment 60 is inserted to the elongated hole portion 13*h* of the door panel 10. The first step ST1 is an inserting step. As illustrated by the arrow of FIG. 15, in the inserting step (the first step ST1), the attachment portion 61 is inserted to the elongated hole portion 13*h* by moving the attachment portion 61 in the direction toward the lock bar 70.

Figure 16:
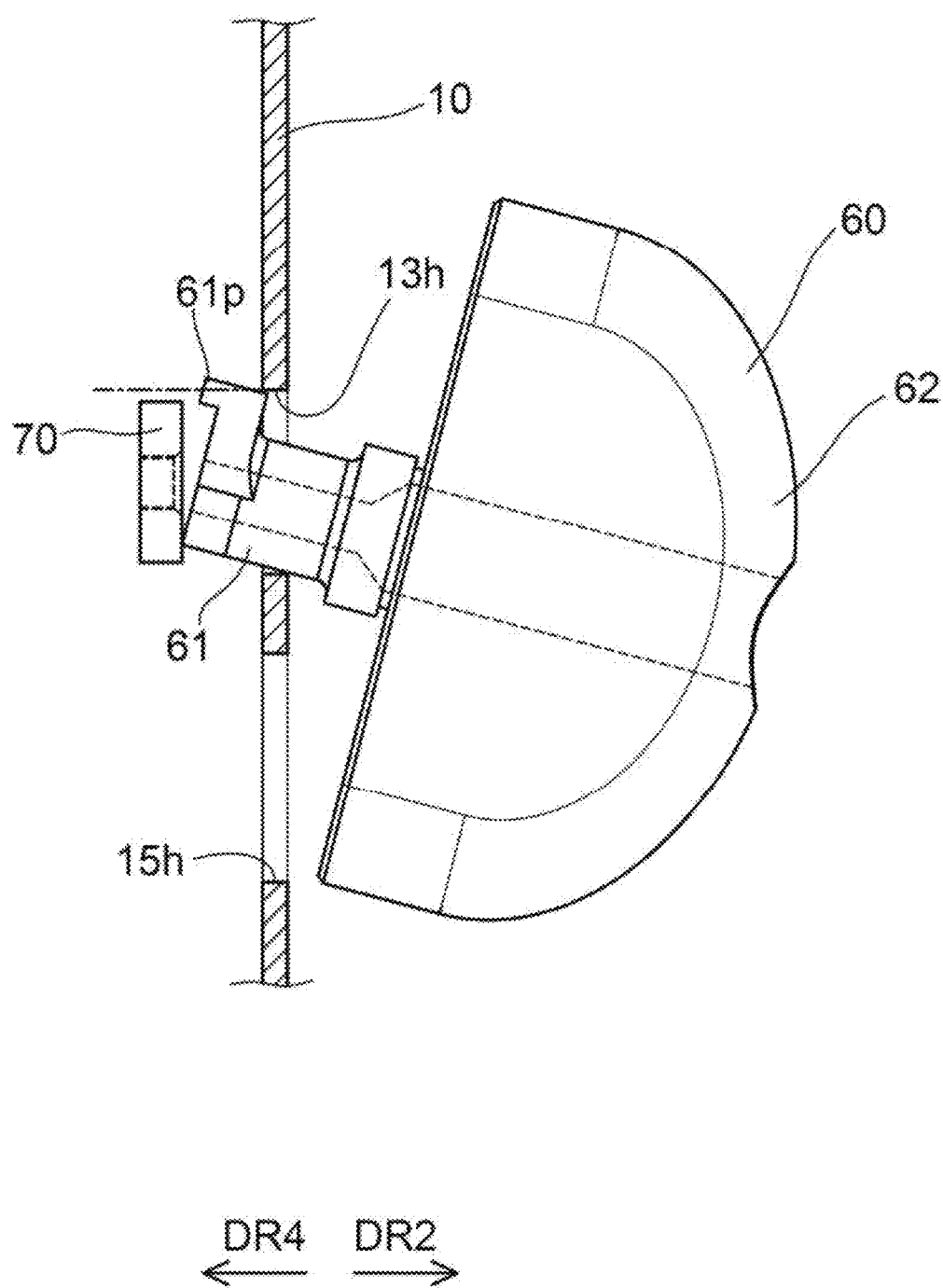
FIG. 16 is a view schematically illustrating a state where one step of the method for attaching the lock knob attachment is being executed.

In the example illustrated in FIG. 16, the inserting step (first step ST1) includes arranging at least a portion 61*p* of the attachment portion 61 at a position hidden by the door panel 10 when viewed in the opposite direction DR4 from the second direction DR2 (incidentally, in FIG. 16, the portion 61*p* is positioned above an upper end of the elongated hole portion 13*h* shown by a dashed dotted line, so that clearly the portion 61*p* is at a position hidden by the door panel 10). In order to arrange the portion 61*p* at a position hidden by the door panel 10, the insertion step preferably includes moving the attachment portion 61 diagonally upward, or moving the attachment portion 61 in the horizontal direction before moving the attachment portion 61 upward.

Figure 17:
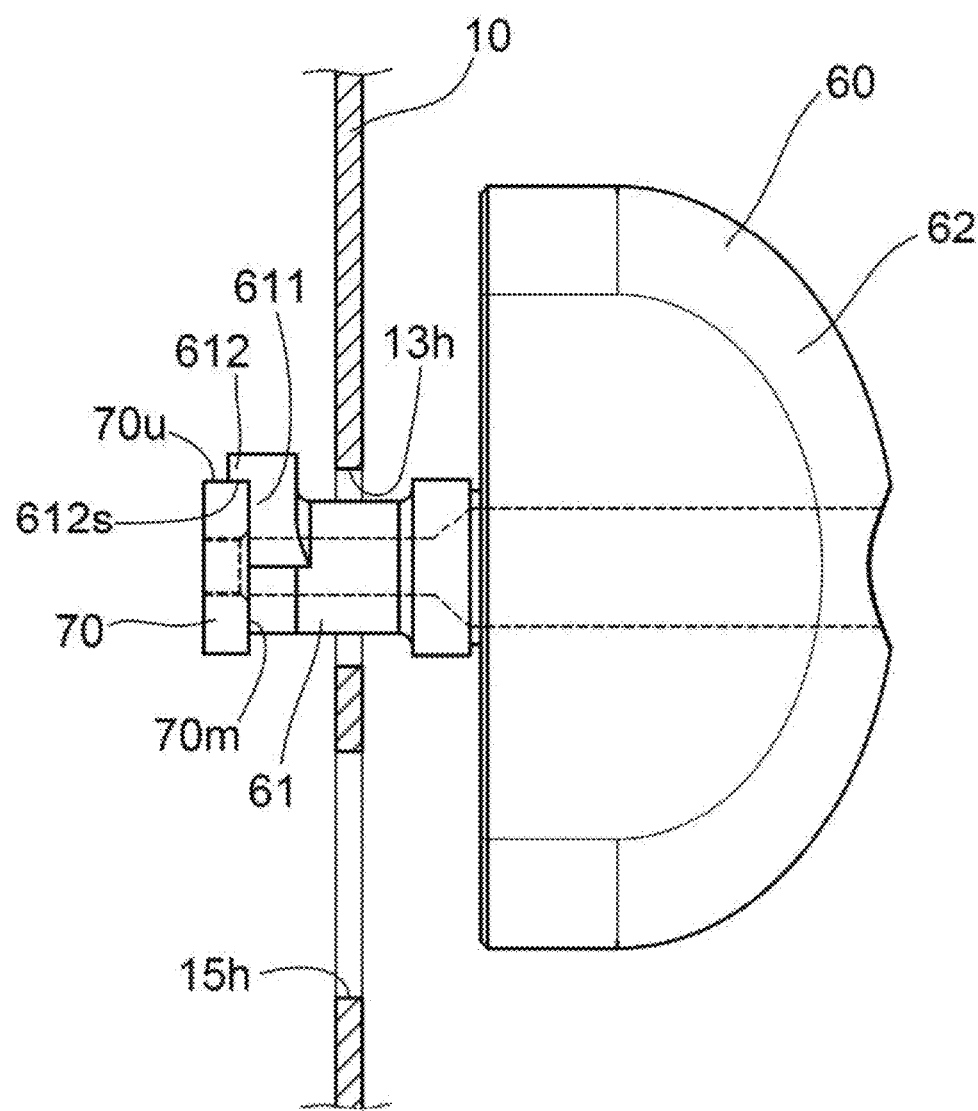
FIG. 17 is a view schematically illustrating a state where one step of the method for attaching the lock knob attachment is being executed.

In the example illustrated in FIG. 17, the insertion step (first step ST1) includes having the first part 611 of the attachment portion 61 come into contact with the principal surface 70*m* of the lock bar 70. The insertion step can include having the second part 612 (more specifically, the rotation step portion 612s) of the attachment portion 61 come into contact with a second surface (70u) perpendicular to the principal surface 70m of the lock bar 70.

In the second step ST2, the attachment portion 61 is fixed to the lock bar 70 via the fastening member 65.

As illustrated in FIG. 12, a fixing step (second step ST2) includes moving the fastening member 65 in the opposite direction DR4 from the second direction DR2 to insert the fastening member 65 to the first through-hole portion 62h of the main body portion 62, the second through-hole portion 61h of the attachment portion 61, and a hole portion 70h of the lock bar 70. According to the example illustrated in FIG. 12, the female screw 750 is formed on the hole portion 70h of the lock bar 70. In this case, the fixing step includes screw-engaging the male screw 650 of the fastening member 65 to the female screw 750 of the lock bar 70.

Figure 18:
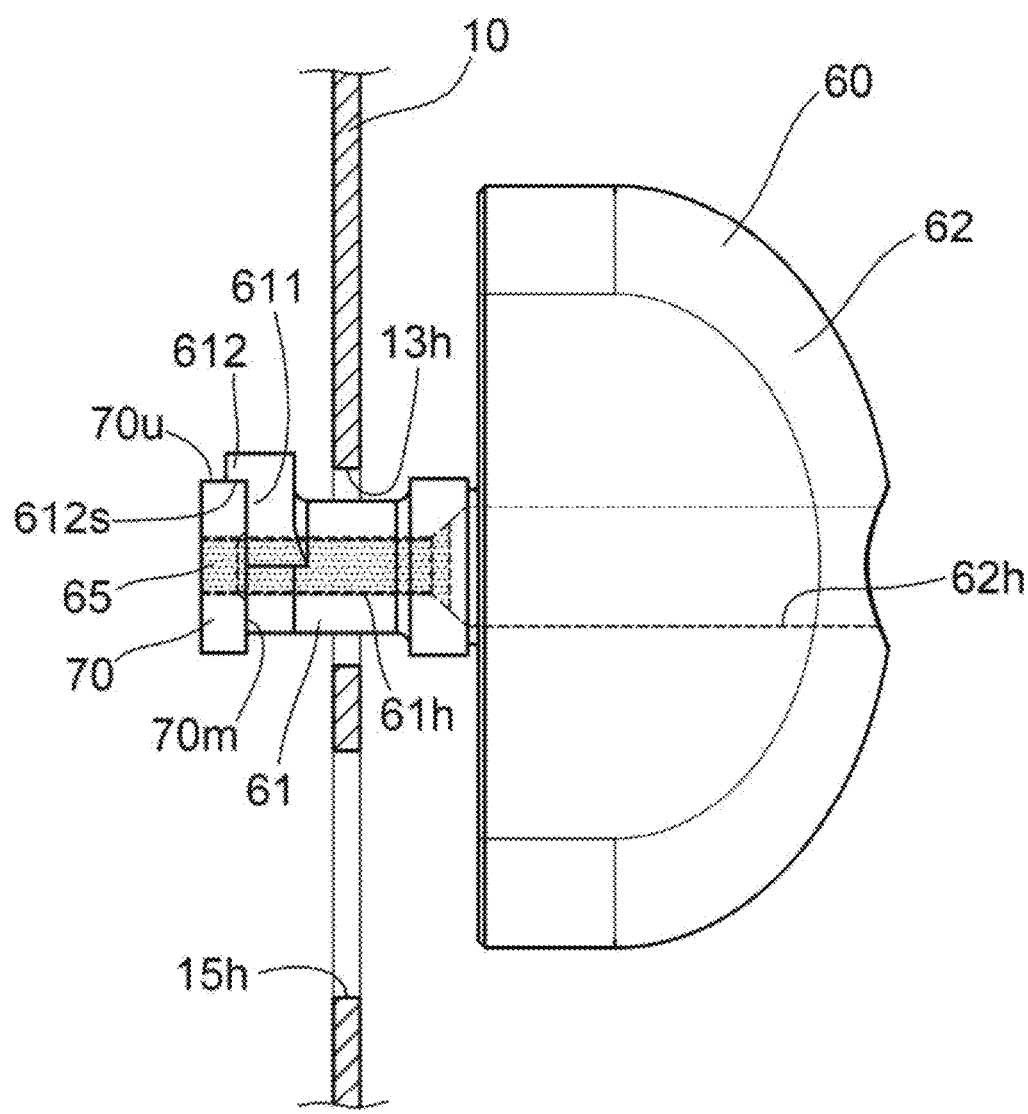
FIG. 18 is a view schematically illustrating a state where one step of the method for attaching the lock knob attachment is being executed.

According to the above-mentioned steps, the lock knob attachment 60 is attached to the lock bar 70 (refer to FIG. 18).

In the method for attaching the lock knob attachment 60 according to the present embodiment, the lock knob attachment 60 can be attached to the base portion 81 of the lock bar 70 arranged inside the door panel 10. Thereby, the operation for attaching the lock knob attachment 60 to the lock bar 70 can be carried out easily. Further, the operation of replacing the lock knob attachment (in other words, the operation of removing the lock knob attachment from the lock bar 70 and attaching a new lock knob attachment 60 to the lock bar 70) can be carried out easily. For example, in a case where the lock knob attachment 60 is damaged or degraded, the damaged or degraded lock knob attachment 60 can be removed from the lock bar 70 and a new lock knob attachment 60 can be attached to the lock bar 70.

The present invention is not limited to the above embodiments or modifications, and it is clear that the embodiments or modifications can be appropriately re-configured or modified within the scope of the technical idea of the present invention. In addition, any component used in each embodiment or each modification can be combined with other embodiments or other modifications, and any component can be omitted in each embodiment or modification.

It should be noted that the descriptions of numerical values for dimensions and areas in the present specification are merely examples. Accordingly, it is needless to say that the description of the numerical values in the present specification does not limit the scope of claims.

This application claims priority to Japanese Patent Application No. 2020-95239, filed Jun. 1, 2020, the disclosure of which is incorporated herein by reference in its entirety.

DESCRIPTION OF THE REFERENCE NUMERAL

1: Door, 1s: Wall surface, 2: Door hinge axis, 3: Handle portion, 4: Center-folding portion, 5: Lock knob, 6: Lock portion, 7: Lock state display portion, 10: Door panel, 11: First panel, 12: Second panel, 13h: Elongated hole portion, 15h: Second elongated hole portion, 20: Handle attachment, 21: Base portion, 22: Door wall surface side, 23: Opposite side from door wall surface side, 24: Flap rotation mechanism, 25: Flap portion, 25h: Through-hole portion, 26: Auxiliary base portion, 27: Distal end portion, 28: Base end portion, 29: Biasing member, 29s: Torsion coil spring, 50: Pin member, 60: Lock knob attachment, 61: Attachment portion, 61h: Second through-hole portion, 61p: Part of attachment portion, 61s: Seat surface, 62: Main body portion, 62h: first through-hole portion, 65: Fastening member, 65a: Head portion, 65b: Shaft portion, 70: Lock bar, 70b: Lower surface, 70h: Hole portion, 70m: Principal surface, 70u: Upper surface, 81: Base portion, 82: Engagement portion, 100: Lavatory, 101: Wall, 101a: First wall, 101b: Second wall, 610h: Part of second through-hole portion that has a greater inner diameter than a maximum outer diameter of head portion of fastening member, 611: First part, 612: Second part, 612s: Rotation stop portion, 613: shaft portion, 613a: First end portion, 613b: Second end portion, 613t: Small-diameter portion, 613w: Large-diameter portion, 614: Weakened portion, 620: Principal surface, 620f: Flat surface, 650: Male screw, 750: Female screw, OP: Opening portion, OP1: Opening, P: Part between elongated hole portion and weakened portion

The invention claimed is:

1. A lock knob attachment comprising:
an attachment portion configured to be attached to a lock bar that is configured to lock a door by sliding in a first direction;
a main body portion coupled to the attachment portion and configured to extend from the attachment portion to a second direction perpendicular to the first direction; and
a fastening member configured to fix the attachment portion to the lock bar,
wherein:
in a state where a direction perpendicular to both the first direction and the second direction is defined as a third direction, a length of the main body portion in a direction along the third direction is greater than a length of the attachment portion in the direction along the third direction,
the main body portion comprises a first through-hole portion,
the attachment portion comprises a second through-hole portion,
the fastening member is inserted to both the first through-hole portion and the second through-hole portion, and
the attachment portion comprises a rotation stop portion configured to prevent the attachment portion and the main body portion from rotating around an axis in a longitudinal direction of the fastening member.

2. The lock knob attachment according to claim 1, wherein the main body portion has a semicircular shape when viewed in a direction along the first direction, and wherein the main body portion has an oval shape when viewed in a direction along an opposite direction from the second direction.

3. The lock knob attachment according to claim 1, wherein the attachment portion comprises:
a first part configured to be in contact with a principal surface of the lock bar; and
a second part configured to be in contact with a second surface that is perpendicular to the principal surface of the lock bar, and
wherein the second part comprises the rotation stop portion.

4. A lavatory door comprising:
the lock knob attachment according to claim 1;
a door panel configured to be attached to a first wall of a lavatory rotatably around a door hinge axis;
a handle portion arranged on the door panel; and
the lock bar,
wherein the door panel comprises a long hole portion in which the attachment portion is configured to be moved in sliding motion.

5. The lavatory door according to claim 4,
wherein the attachment portion comprises a weakened portion configured to define a rupture position of the attachment portion, and
wherein the weakened portion is arranged on the second direction side than the long hole portion.

6. The lavatory door according to claim 5,
wherein the weakened portion is arranged on the second direction side than an end on the second direction side of a fastening member configured to fix the attachment portion to the lock bar.

7. A method for attaching a lock knob attachment to a lavatory door,
wherein the door comprises:
a door panel configured to be attached to a first wall of a lavatory rotatably around a door hinge axis and configured to include a long hole portion; and
a lock bar comprising a base portion arranged inside the door panel, and an engagement portion configured to be engaged with a second wall of the lavatory, the lock bar being configured to change positions from an unlocked position retracted from the second wall to a locked position engaged with the second wall by sliding in a first direction,
wherein the lock knob attachment comprises:
an attachment portion configured to be attached to the lock bar and configured to be moved along the long hole portion in a sliding motion; and
a main body portion coupled to the attachment portion and configured to extend from the attachment portion to a second direction perpendicular to the first direction,
wherein, in a state where a direction perpendicular to both the first direction and the second direction is defined as a third direction, a length of the main body portion in a direction along the third direction is greater than a length of the attachment portion in a direction along the third direction,
wherein the method for attaching the lock knob attachment comprises:
a step of inserting the attachment portion to the long hole portion by moving the attachment portion in a direction toward the lock bar; and
a step of fixing the attachment portion to the lock bar via a fastening member, and
wherein the step of inserting comprises:
arranging at least a part of the attachment portion to a position hidden by the door panel when viewed in an opposite direction to the second direction.

8. The method for attaching the lock knob attachment according to claim 7,
wherein the step of fixing comprises:
moving the fastening member to an opposite direction from the second direction so as to insert the fastening member to a first through-hole portion of the main body portion, a second through-hole portion of the attachment portion, and a hole portion of the lock bar.

9. A lavatory door comprising:
a door panel configured to be attached to a first wall of a lavatory rotatably around a door hinge axis;
a handle portion arranged on the door panel;
a lock bar that is configured to lock the lavatory door by sliding in a first direction; and
a lock knob attachment including:
an attachment portion configured to be attached to the lock bar; and
a main body portion coupled to the attachment portion and configured to extend from the attachment portion to a second direction perpendicular to the first direction,
wherein:
in a state where a direction perpendicular to both the first direction and the second direction is defined as a third direction, a length of the main body portion in a direction along the third direction is greater than a length of the attachment portion in the direction along the third direction,
the door panel comprises a long hole portion in which the attachment portion is configured to be moved in a sliding motion,
the attachment portion comprises a weakened portion configured to define a rupture position of the attachment portion, and
the weakened portion is arranged on the second direction side than the long hole portion.

10. The lavatory door according to claim 9,
wherein the weakened portion is arranged on the second direction side than an end on the second direction side of a fastening member configured to fix the attachment portion to the lock bar.

* * * * *